March 17, 1964     H. A. TRUPP ETAL     3,124,968

TWO-SPEED TRANSMISSION MECHANISM FOR WASHING MACHINE

Filed Feb. 1, 1962

INVENTORS
HERMANN A. TRUPP
LEONARD I. KOWNURKO
BY

ATTORNEY

United States Patent Office 3,124,968
Patented Mar. 17, 1964

3,124,968
TWO-SPEED TRANSMISSION MECHANISM
FOR WASHING MACHINE
Hermann A. Trupp, Philadelphia, and Leonard I. Kownurko, Holland, Pa., assignors to Philco Corporation, Philadelphia, Pa., a corporation of Delaware
Filed Feb. 1, 1962, Ser. No. 173,320
3 Claims. (Cl. 74—217)

The present invention relates to laundry machines, more particularly to fabric washing machines of the type including a rotatable perforated cylinder mounted to rotate about a generally horizontal axis and adapted to effect washing and rinsing of fabrics in water supplied to a tub containing the cylinder, the latter being also adapted to effect damp-drying of wet fabrics by extracting water retained in the fabrics after washing and rinsing thereof.

In a machine of that type, the rotatable cylinder is driven at comparatively low speed (e.g. 50–60 r.p.m.) to tumble the fabrics during washing and rinsing operations, and at comparatively high speed (e.g. several hundred r.p.m.) to centrifuge the wet fabrics during water extracting operations. This variable speed operation is accomplished by a transmission mechanism operable selectively either to drive the cylinder from a motor shaft through a speed reduction system so as to rotate the cylinder at the tumbling speed, or to drive the cylinder from the motor shaft by-passing such system, and thereby to rotate the drum at the centrifuging speed.

A general objective of this invention is to minimize the problems and difficulties which arise when associating multiple speed transmission mechanisms with fabric washing machines especially those adapted for domestic use where quietness of operation and compactness of design are of prime importance. Toward this general end, the invention provides a simplified two-speed transmission mechanism which functions without intermeshing gears and pinions, and which is made up of comparatively few uncomplicated parts capable of being assembled in close adjacency so as to occupy minimum space.

It is also an object of the invention to provide an improved two-speed transmission mechanism which eliminates space-occupying and cumbersome mounting structures. For that purpose the transmission mechanism of the invention employs low speed and high speed belt-and-pulley assemblies and simple clutch arrangements for controlling the functions of such assemblies, all but very few parts of the transmission mechanism being concentrically disposed with respect to each other and mounted axially and contiguously upon a comparatively short extension of the driving motor shaft.

The invention is particularly characterized by the fact that the multiple speed transmission mechanism which it provides to drive the rotatable cylinder of the washing machine either at high speed or at low speed, does not interfere with manual rotation of the cylinder in a free unrestricted manner when the washing machine is turned off. Accordingly, the mechanism of the invention, although capable of broader application, is especially useful and advantageous when employed in a compact top-access washing machine in which the circumferential wall of a cylinder mounted to rotate about a generally horizontal axis, has a section movable to uncover an opening in said wall so that fabrics can be placed into or removed from the cylinder, and it is in conjunction with such a machine that the invention will be described.

The nature of the invention and the manner in which the above mentioned as well as other objects and characteristic features of the invention are realized, will be more fully understood from the following description taken in conjunction with the accompanying drawing, in which.

Figure 1:
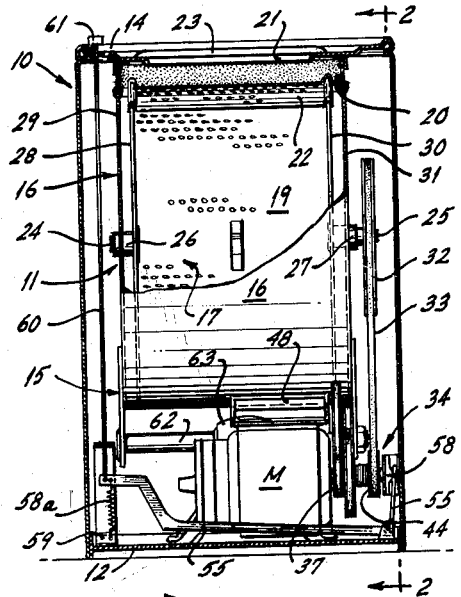
FIGURE 1 is a sectional-elevational side view illustrating a washing machine which incorporates a preferred embodiment of the invention.
Figure 2:
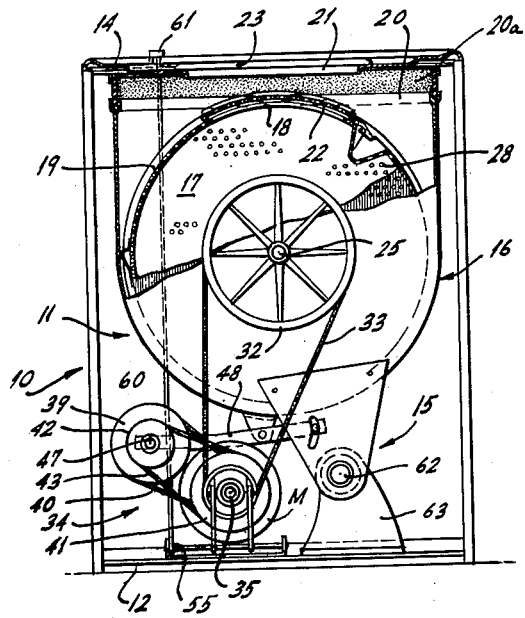
FIGURE 2 is a vertical sectional view taken substantially along the plane of line 2—2 in FIGURE 1.

With more particular reference to the drawing, the washing machine illustrated in FIGURES 1 and 2, includes an outer cabinet 10 and a cylinder-and-tub assembly 11; the cabinet being provided with a floor 12 and a top 14, and the cylinder-and-tub assembly being supported in an elevated position on a mounting structure 15 above said floor so that the uppermost portion of said assembly 11 lies adjacent said top.

The assembly 11 comprises an upright tub 16 and a perforated cylinder 17. This cylinder 17 is rotatable about a generally horizontal axis within the tub 16 and has an open area 18 which is located in peripheral wall 19 of said cylinder and adapted to be brought into registry with open top 20 of said tub. This open top of the tub is disposed in alignment with an access opening 21 in the top 14 of the cabinet 10. Thus, fabrics may be put into and taken out of cylinder 17 through the aforesaid access opening 21, open top 20 and open area 18, said open area being normally closed by a displaceable wall section 22 of the cylinder 17 and said access opening being normally closed by a movable cover 23. The gap between the cabinet top 14 and the tub top 20 is sealed by a gasket 20a of resilient material such as rubber.

The cylinder 17 is rotatably supported within the tub 16 by axially related shafts 24 and 25 and bearings 26 and 27; the first stub shaft 24 being rigid with front wall 28 of the cylinder and journalled in the first bearing 26 which is carried by front wall 29 of the tub 16, and the second stub shaft 25 being rigid with rear wall 30 of said cylinder and journalled in second bearing 27 which is carried by rear wall 31 in said tub.

In the illustrated embodiment and as seen in FIGURES 1 and 2, the stub shaft 25 projects beyond the rear wall 30 of the tub, and a main pulley 32 is keyed or otherwise secured to said shaft. This pulley 32 is driven through a main belt 33 from multiple speed transmission mechanism 34 in which additional pulleys and belts are cooperatively associated with clutching apparatus to drive cylinder 17 in the manner stated above, that is to say either at low (tumbling) speed or at higher (centrifuging) speed, by means of an electric motor M having a unidirection constant speed power-delivering shaft 35.

Figure 3:
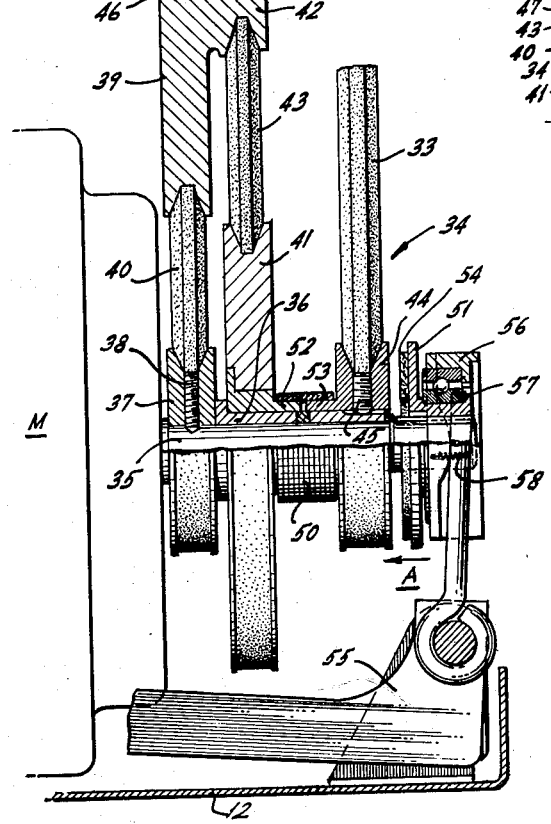
FIGURE 3 is an enlarged fragmentary view, partly in vertical axial section, of the two-speed drive mechanism incorporated in the machine illustrated in FIGURES 1 and 2.

The construction and operation of the transmission mechanism 34 will be more fully understood from FIGURE 3. As clearly shown in FIGURE 3, the transmission mechanism includes the motor shaft 35 and a sectional sleeve 36 concentric with and rotatable about said shaft. A first pulley 37 is fixedly anchored, as by means of a lock screw 38, on the motor shaft 35 to rotate therewith, this first pulley 37 being connected to a first rotatable idler 39 through a first belt 40. A second pulley 41 is rotatably journalled on one section of the sleeve 36 to rotate about the motor shaft 35 with respect to the other section of said sleeve. This second pulley 41 is connected to a second idler 42 through a second belt 43. A third pulley 44 is rigidly secured, as by lock screw 45, to said other section of the sleeve 36 to rotate therewith about the motor shaft 35 and is arranged in engagement with the main belt 33 which as indicated above is associated with the cylinder pulley. The mentioned idlers 39 and 42 are parts of a single member rotatable in a ball bearing 46 mounted on an axle 47 carried by a pivotally supported bracket 48 which, as seen in FIGURE 2, serves to suspend the motor M from the underside of the tub 16. The belted pulleys and idlers have different diameters to provide for the desired rotational speed of the cylinder 17 driven from the motor shaft 35.

The clutching apparatus incorporated in the transmission mechanism 34 to effect transition from one to the other of the above-mentioned two speeds, includes a one way clutching spring coil 50 and a friction clutching plate 51. The clutching coil 50 is disposed between the aforesaid pulleys 41 and 44 to overlap a laterally extended hub 52 on pulley 41 and an adjoining annular flange 53 on pulley 44. The clutch plate 51 is splined to the motor shaft 35 to rotate therewith as well as to slide longitudinally thereof so that the friction face 54 of said plate can be brought into and out of clutching engagement with the corresponding face of the aforementioned pulley 44.

As represented in the drawing, the slidable movement of the clutch plate 51 to control the two speed function of the transmission mechanism, is accomplished by means of a linkage system which includes a bell crank lever arrangement 55 operable to move a frame element 56 connected by a ball bearing 57 to the friction clutch plate 51 for sliding the latter on the motor shaft 35 into clutching engagement with the confronting pulley 44. The frame element 56 and associated clutch plate 51 are normally biased away from the pulley 44 by means of a spring connection 58 between said element and lever arrangement 55. The frame element 56 and clutch plate 51 are normally urged toward pulley 44 by means of another spring connection 58a between said arrangement 55 and a member 59 affixed to the cabinet 10. A rod 60 connected to the lever arrangement 55 extends outwardly of the cabinet and terminates with a latching knob 61. This knob is operable to actuate the rod 60 for moving and locking the above described linkage system so as to effect disengagement of the clutch plate 51 from the pulley 44 as illustrated in FIGURE 3, or to release said rod for freeing said system thereby providing for movement of the clutch plate as indicated by arrow A in FIGURE 3 to effect engagement of said plate with said pulley 44.

In the illustrated embodiment, the mounting structure 15 referred to above includes a torsion rod and sleeve arrangement 62 rigid with the tub 16 and torsionally supported in a bracket 63 anchored on the floor 12 of the cabinet 10. Such torsional mounting minimizes the effects of vibrations which are brought about during rapid rotation of the cylinder 17 should the fabrics be unevenly distributed therein.

From the preceding description, it will be understood that upon rotation of the motor shaft 35 with clutch plate 51 out of engagement with pulley 44, the first pulley 37 will drive the idlers 39 and 42 which in turn will rotate the second pulley 41 so as to tighten the one way clutching coil 50 thereby imparting rotation to the third pulley 44 which then rotates the cylinder 17 through main belt 33 and main pulley 32. Under this condition of operation, the transmission mechanism drives the cylinder 17 at tumbling speed since power is transmitted through the speed reduction provided by the belted pulleys and idlers of said mechanism.

Rotation of motor shaft 35 with clutch plate 51 in engagement with pulley 44, results in a condition where said pulley 44 is driven at the rotational speed of the motor shaft since engagement of the clutch plate in effect provides direct connection between pulley 44 and said motor shaft. Under this later condition of operation, the pulley 44 overrides the clutching coil 50 and drives the cylinder 17 at centrifuging speed through main belt 33 and main pulley 32.

From the foregoing description it will be appreciated that the two speed transmission mechanism of this invention provides for driving the cylinder of the washing machine either at tumbling speed or at centrifuging speed with a unidirectional single speed motor. Moreover, the cooperative association of the elements of the transmission mechanism makes it easy, while the machine is stopped, to rotate the cylinder by hand in one direction for the reason that the pulley 44 can overrun the companion pulley 41 so as to relax the clutching coil 50 and thus effect disconnection between the low and high drive systems. Also, the frictional clutch plate 51 can perform as a torque limiter since such plate provides for slippage thereby preventing damage to the machine should adverse load conditions arise.

While a preferred embodiment has been shown and described, it will be understood that the invention is not limited to that embodiment, but is capable of being incorporated in other specific structures of this embodiment and embraces such changes and variations as come within the scope of the subjoined claims.

We claim:

1. For a washing machine having a rotatable cylinder, a two-speed transmission mechanism for driving the cylinder selectively either at tumbling speed or at centrifuging speed, said mechanism comprising a constant speed motor shaft, an axle mounted in spaced parallelism with respect to said shaft, a first pulley anchored to said motor shaft to rotate therewith, a first idler rotatably carried by said axle and belted to said first pulley to be rotated thereby, a second idler also rotatably carried by said axle and rotatable with said first idler, a second pulley mounted to rotate about said shaft and belted to said second idler to be rotated thereby, a third pulley mounted to rotate about said shaft and with respect to said second pulley and adapted for connection with the machine cylinder to impart rotational motion thereto, a one way clutching element arranged between said second pulley and said third pulley to drive the latter in response to rotation of said second pulley, a friction clutch element connected between said motor shaft for rotation therewith and for movement thereon with respect to said third pulley, and means for moving the friction clutch into clutching engagement with said third pulley to drive the same directly from the motor shaft while overriding said one way clutch element.

2. A two-speed transmission mechanism as set forth in claim 1, in which the mentioned second pulley has a laterally projecting hub portion, the mentioned third pulley has a lateral annular flange terminating adjacent said hub portion, and the mentioned one way clutching element is in the form of a spring coil overlapping said hub portion and said flange.

3. For a washing machine having a rotatable cylinder, a two-speed transmission mechanism for driving the cylinder selectively either at tumbling speed or at centrifuging speed, said mechanism comprising a constant speed motor shaft, an axle mounted in spaced parallelism with respect to said shaft, a sectional sleeve concentric with and rotatable about said shaft, a first pulley anchored to said motor shaft to rotate therewith, a first idler rotatably supported on said axle and belted to said first pulley to be rotated thereby, a second idler also rotatably supported on said axle and rotatable with said first idler, a second pulley rotatably journalled on one section of said sleeve and belted to said second idler to be rotated thereby, a third pulley fixedly secured to another section of said sleeve and adapted for connection with the machine cylinder to impart rotational motion thereto, a one way clutching element arranged between said second pulley and third pulley to drive the latter in response to rotation of said second pulley in one direction, a friction clutch element connected to said motor shaft for rotation therewith and for movement thereon with respect to said third pulley, and means for moving the friction clutch element into clutching engagement with said third pulley to drive the same directly from said motor shaft while overriding said one way clutch element.

References Cited in the file of this patent

UNITED STATES PATENTS

| | | |
|---|---|---|
| 2,568,134 | Tharpe | Sept. 18, 1951 |
| 2,694,175 | Davis | Nov. 9, 1954 |
| 2,885,896 | Hungerford et al. | May 12, 1959 |
| 2,942,447 | Rickel et al. | June 28, 1960 |
| 2,951,389 | Wille | Sept. 6, 1960 |